United States Patent
Hoctor et al.

(10) Patent No.: US 7,663,105 B2
(45) Date of Patent: Feb. 16, 2010

(54) APPARATUS AND METHOD FOR IMAGE RECONSTRUCTION FOR A SYNTHETIC APERTURE GAMMA RAY IMAGER

(75) Inventors: Ralph Thomas Hoctor, Saratoga Springs, NY (US); Scott Stephen Zelakiewicz, Niskayuna, NY (US); Evren Asma, Niskayuna, NY (US); Jeffrey Gordon, Niskayuna, NY (US); Floribertus P. M. Heukensfeldt Jansen, Ballston Lake, NY (US)

(73) Assignee: Morpho Detection, Inc., Newark, CA (US)

( * ) Notice: Subject to any disclaimer, the term of this patent is extended or adjusted under 35 U.S.C. 154(b) by 0 days.

(21) Appl. No.: 12/331,936

(22) Filed: Dec. 10, 2008

(65) Prior Publication Data
US 2009/0296890 A1   Dec. 3, 2009

Related U.S. Application Data

(60) Provisional application No. 61/057,579, filed on May 30, 2008.

(51) Int. Cl.
*G01T 1/00* (2006.01)
(52) U.S. Cl. .................... 250/336.1; 250/395
(58) Field of Classification Search .............. 250/336.1, 250/363.04, 395
See application file for complete search history.

(56) References Cited

U.S. PATENT DOCUMENTS

2008/0267477 A1 * 10/2008 Conti et al. .................. 382/131

OTHER PUBLICATIONS

Ziock et al., "A Fieldable-Prototype, Large-Area, Gamma-Ray Imager for Orphan Source Search," IEEE Nuclear Science Symposium Conference Record, 2007, pp. 949-958.

Ziock et al., "Large Area Imaging Detector for Long-Range, Passive Detection of Fissile Material," IEEE Transactions On Nuclear Science, vol. 51, No. 5, Oct. 2004, pp. 2238-2244.

Ziock et al., "Source-Search Sensitivity of a Large-Area, Coded-Aperture, Gamma-Ray Imager," IEEE Transactions On Nuclear Science, vol. 53, No. 3, Jun. 2006, pp. 1614-1621.

Hudson et al., "Accelerated Image Reconstruction Using Ordered Subsets of Projection Data," IEEE Transactions On Medical Imaging, vol. 13, No. 4, Dec. 1994, pp. 601-609.

Shepp et al., "Maximum Likelihood Reconstruction for Emission Tomography," IEEE Transactions On Medical Imaging, vol. MI-1, No. 2, Oct. 1982, pp. 113-122.

* cited by examiner

*Primary Examiner*—David P Porta
*Assistant Examiner*—Mark R Gaworecki
(74) *Attorney, Agent, or Firm*—Armstrong Teasdale LLP

(57) ABSTRACT

An imaging system includes a platform having mounted thereon a coded-aperture imaging device and positioned to receive radiation over a baseline. The imaging system includes a computer configured to acquire a plurality of far-field datasets over the baseline, the plurality of far-field datasets comprising data received via the coded-aperture imaging device. The computer is also configured to form a preliminary image based on the acquired plurality of far-field datasets, and apply an expectation maximization (EM) algorithm to the preliminary image; wherein the EM algorithm includes an ordered subset algorithm.

24 Claims, 3 Drawing Sheets

US 7,663,105 B2

APPARATUS AND METHOD FOR IMAGE RECONSTRUCTION FOR A SYNTHETIC APERTURE GAMMA RAY IMAGER

CROSS-REFERENCE TO RELATED APPLICATION

The present application is a non-provisional of, and claims priority to, U.S. Provisional Application 61/057,579 filed May 30, 2008, the disclosure of which is incorporated herein.

GOVERNMENT LICENSE RIGHTS

The U.S. Government has a paid-up license in this invention and the right in limited circumstances to require the patent owner to license others on reasonable terms as provided for by the terms of contract No. HSHQDC-07-C-00092 awarded by the U.S. Department of Homeland Security.

BACKGROUND OF THE INVENTION

The invention relates generally to detecting a gamma ray point source and, more particularly, to a method and apparatus of image reconstruction for a synthetic aperture gamma ray imager.

Radioactive materials can be detected by the gamma radiation that they produce as component radioisotopes decay. This radiation is produced from a source of radioactive materials that may be used in a nuclear device or a radiological dirty bomb, as examples. Detection of gamma radiation may take place in the presence of naturally-occurring background gamma radiation, which can originate from soil or building materials, for example. When the gamma radiation from a concentration of radioactive materials is sensed close to its source, this background radiation does not present an impediment to source detection due to the high gamma photon flux emanating from the source. When the sensing apparatus is far removed from the radiation source, though, detection of the source against the background presents challenges. When the aggregate background radiation produces counts at a higher rate than the source, a non-imaging radiation detector may not be able to detect the presence of the source at all. Even if a source is close enough to the apparatus to be detected, a non-imaging radiation detector may establish only the proximity to the point at which the detector observed the largest signal and is not typically capable of pinpointing the source location In applications that include stand-off mode (i.e., measured at a distance), such as, for example, in a reconnaissance operation seeking the source of gamma radiation, the total number of counts detected from the source is typically much smaller than the number of counts detected from background. In such a case, detection of the source may be facilitated by forming an image of the source distribution. Imaging data may be acquired when the platform on which the imaging apparatus is mounted is moving, and when this is the case, the path of the platform is called the imaging baseline. The image formed in this mode is a synthetic aperture image, and the effective aperture of this image is the imaging baseline. Thus, the synthetic aperture can be very large when compared with the dimension of the actual imaging device. This means that source, which may be in the far field of the imaging apparatus, is in the near field of the synthetic aperture.

Forming an image from data acquired over the length of the baseline serves to distribute the background measurement over a large area, making it clear that the background of the measurement does not represent a point source. An actual point source, on the other hand, is imaged and will show in the image as a point, and so the point is made detectable despite a high aggregate background.

A mode of imaging used in some systems is known as back-projection or laminography. One approach forms a near field image from multiple far field images, which are functions of angle only, by extending the far field image value at each angle to all near field pixels (or voxels) that lie at that angle. This description applies both to the extension of a one dimensional far file image to a two dimensional (planar) near field image and to the extension of a two dimensional near field image to a three dimensional (volumetric) near-field image. Such a generation of near field imagery from far field imagery is sometimes referred to as tomographic imaging.

One field in which tomographic imaging is widely practiced is that of emission tomography. A known example of such an imaging approach is SPECT (Single Photon Emission Computed Tomography). The basic problem of SPECT is to form an image of a high-energy photon emitting substance within the human body, and as such it shares some of the features of the problem of detection of radioactive point sources. The main differences are the absence of a high level of background radiation in SPECT, the absence of a complete circuit around the area of interest in the gamma source detection application and the fact that the source is known a priori to exist in the SPECT image, and not in the source surveillance image.

The field of emission tomography makes use of several reconstruction approaches that include statistical reconstruction techniques based on an Expectation Maximization (EM) algorithm for iteratively computing maximum likelihood estimates of parameters in so-called "hidden data" problems. The first application of this approach to low-count emission tomography was proposed by Shepp and Vardi. Later, Hudson and Larkin found that the convergence of this algorithm could be improved referred to as an Ordered Subsets Expectation Maximization (OSEM) algorithm.

The tomographic reconstruction approaches described above depend on the ability to produce an image of the source distribution that is angle specific. For example, in SPECT, collimators are used that limit the response of a certain detector to a given direction in space.

One method for producing a far-field image from the basic imaging apparatus may use standard, correlation-based coded-aperture imaging that includes using a device having an aperture composed of photon-absorbing elements positioned in front of a position-sensitive detector array (such as an Anger camera). This mode of operation is advantageous in that more than a single location on the position-sensitive detector is employed to measure photons from every direction, so that a larger number of source photons are recorded than with a parallel-hole collimator, for example. An associated disadvantage is that recorded energy from a source is spread out over a large range of angles in addition to the correct one, although the incorrectly attributed energy is spread to different angles for different PSD detector locations.

While imaging has an advantage over simple radiation counting in terms of detection, certain combinations of source and background emission rates, and source distance and total observation time, can cause images of point sources in background to fail to unambiguously image a point source. Further, although imaging may favorably increase the probability of detection, there may be a corresponding increase in the probability of a false alarm occurring. Thus, when background radiation level is high and when the false alarm rate requirement is low, detection may be difficult, and the threshold may have to be set high. The higher threshold means that many images with moderate but acceptable contrast may be errantly rejected as not having a source, or "missed." Contrast enhancement using a point-wise, non-data-adaptive image transform can transform some of these misses into detections, but such algorithms also tend to create false detections when there is no source—which may cause the threshold to be set to an even higher threshold to reject them.

Therefore, it would be desirable to design an apparatus and method of image reconstruction for a synthetic aperture gamma ray imager that results in a higher-contrast reconstructed image with enhanced source detectability in high levels of background radiation.

SUMMARY

Embodiments of the invention provide an apparatus and method that overcome at least one of the aforementioned drawbacks. A system and method is disclosed that includes an imaging device positioned to receive radiation from a source over an imaging baseline. The device is configured to acquire imaging data, process the data into an image, and enhance contrast of the image.

According to one aspect of the invention an imaging system includes a platform having mounted thereon a coded-aperture imaging device and positioned to receive radiation over a baseline. The imaging system includes a computer configured to acquire a plurality of far-field datasets over the baseline, the plurality of far-field datasets comprising data received via the coded-aperture imaging device. The computer is also configured to form a preliminary image based on the acquired plurality of far-field datasets, and apply an expectation maximization (EM) algorithm to the preliminary image; wherein the EM algorithm includes an ordered subset algorithm.

In accordance with another aspect of the invention, a method of imaging includes acquiring, via a position-sensitive detector, a plurality of far-field images, each far-field image comprising a measured distribution of photons on the position-sensitive detector acquired along an imaging baseline. The method further includes reconstructing a near-field image using the plurality of far-field images, and enhancing contrast using at least one iteration of an expectation maximization (EM) reconstruction algorithm, wherein the far-field images are ordered as subsets of data.

Yet another aspect of the invention includes a computer readable storage medium having stored thereon a program, which, when executed by a processor, causes the processor to acquire a plurality of real-valued images of a radiation source from a coded-aperture imaging device over a synthetic aperture and located in a far-field of the radiation source, reconstruct a near-field image of the source using the real-valued images, and enhance contrast of the reconstructed near-field image using an ordered subsets expectation maximization (OSEM) algorithm.

These and other advantages and features will be more readily understood from the following detailed description of preferred embodiments of the invention that is provided in connection with the accompanying drawings.

DETAILED DESCRIPTION OF EXEMPLARY EMBODIMENTS

The method and apparatus described herein are directed toward detection of a point source of gamma radiation in high levels of background radiation. While embodiments of the invention are described with respect to a method and apparatus directed toward reconstructing a near-field image of a gamma source, the method and apparatus described may be applicable to identifying a broad range of low-level radiation sources against a high-level background.

Figure 1:
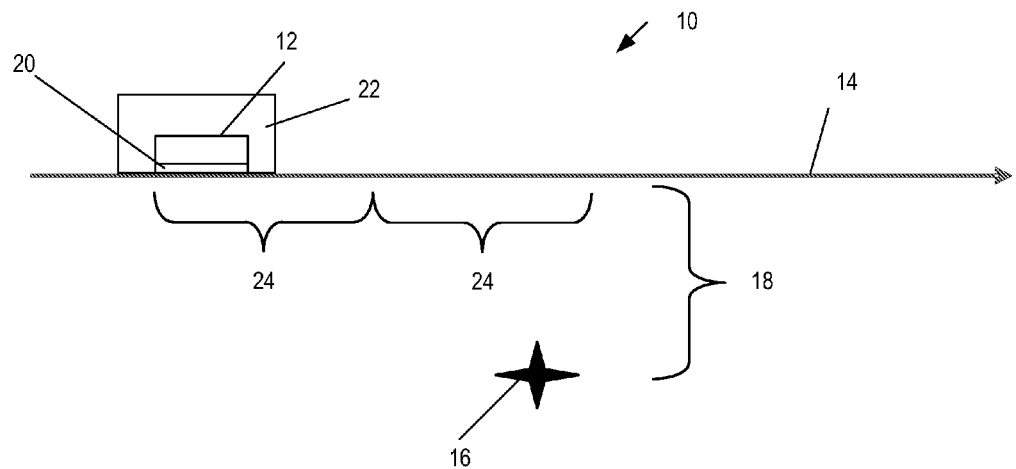
FIG. 1 illustrates an imaging scenario according to an embodiment of the invention.

FIG. 1 illustrates an imaging scenario 10 according to an embodiment of the invention. Imaging scenario 10 includes an imaging system or device (which may include an imaging aperture mask and a position-sensitive detector such as an Anger camera, as an example) 12 configured to move along a synthetic aperture or baseline 14 while acquiring far-field imaging data, datasets, or real-valued imaging data, when gamma source 16 is positioned in a far-field of imaging device 12. Gamma source 16 represents a source of radioactive materials that may be used in a nuclear device or a radiological dirty bomb, as examples. Imaging device 12 moves along a synthetic aperture or baseline 14 and passes within a distance 18 of gamma source 16. The imaging device 12, in this embodiment, includes a coded aperture or mask 20 and may be transported on a mobile platform 22 such as a truck, a sport utility vehicle (SUV), an airplane, a helicopter, and the like. In embodiments of the invention, the platform position is known or derived from global positioning satellites (GPS), inertial guidance systems, and the like.

In operation, imaging device 12 is caused to acquire far-field imaging data over a plurality of sub-apertures 24. The far-field images include a plurality of far-field images from a source, such as gamma source 16, and each far-field image includes a measured distribution of photons on a position-sensitive detector acquired along the baseline 14. Thus, in general, a plurality of far-field images are acquired with the platform positioned over N baseline segments or sub-apertures 24 along a baseline or path 14, wherein N is an integer $\geq 2$.

Image formation occurs over a period of time during which the mobile platform 22 moves along baseline 14. The image formation approach is a synthetic aperture, near-field imaging scheme based on multiple far-field images. At a set of locations (not shown) of the mobile platform 22, far-field images or datasets of the gamma source 16 are computed using the coded-aperture imaging device 12, and these images are back-projected, registered and added to produce a final near-field image of gamma source 16. Such addition of real-valued images from sub-apertures 24 is a known approach to synthetic aperture imaging. Because the baseline 14 is so much larger than the physical aperture of imaging device 12, gamma source 16 is in the far field of the physical imaging device 12, but in the near field of a near-field image generated from the far-field images acquired over the sub-apertures 24 along baseline 14.

Figure 2:
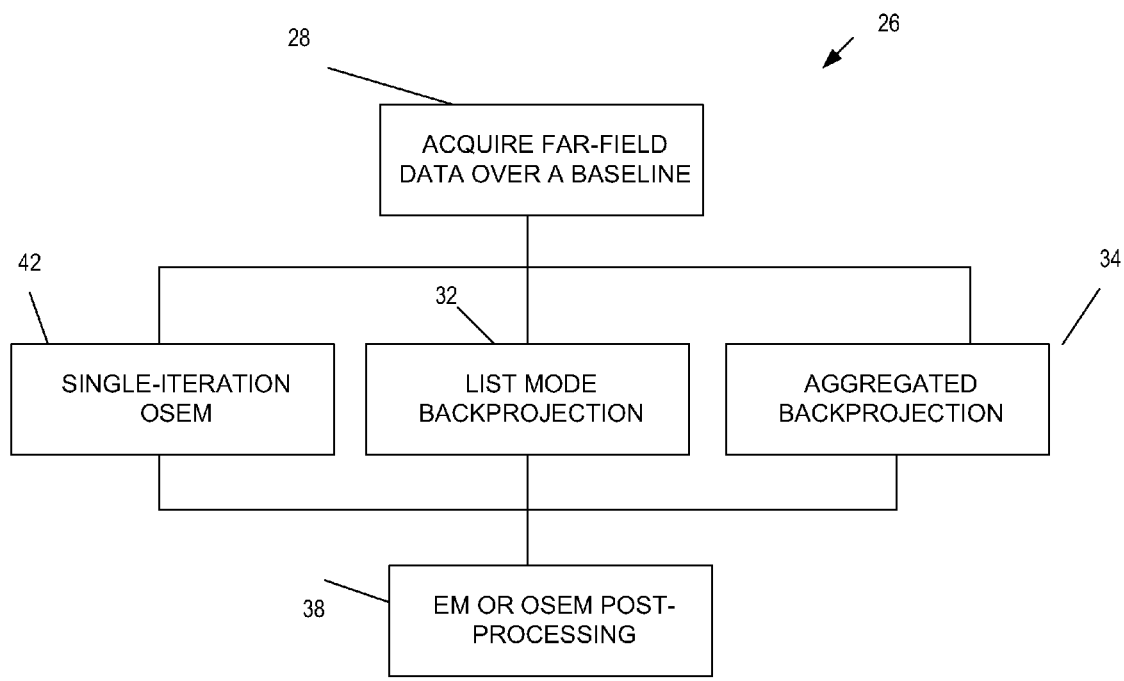
FIG. 2 illustrates a flowchart for data acquisition and contrast enhancement according to embodiments of the invention.

FIG. 2 illustrates a flowchart for data acquisition and contrast enhancement according to embodiments of the invention. FIG. 2 illustrates a process 26 that begins by acquiring far-field data over a baseline at step 28 as described with respect to FIG. 1. Process 26 illustrates image reconstruction according to embodiments of the invention, as will be further described. Image reconstruction may include back-projecting far-field data, acquired at step 28, in either list mode 32 or aggregated mode 34, before further OSEM post-processing 38 the image. Alternatively a single-iteration (ordered subset expectation maximization) OSEM 42 algorithm may be applied in lieu of back-projection before further OSEM post-processing 38 the image.

For illustrative and exemplary purposes, in the following FIGS. 3-6 and still referring to FIGS. 1 and 2, source 16 will be taken to be 1 mCi of $^{137}$Cs, located at a perpendicular distance 18 of 100 meters from the baseline 14. Mask 20 of imaging device 12 is taken to have an approximately 50% filled coding, and gamma source 16 is taken to result in 50 counts/sec from the gamma source 16 at closest approach. Mask 20 includes a defined pattern of apertures therein such that each far-field image acquired is a shadow of the mask 20 formed at positions on the imaging device 12. Furthermore, the length of the baseline 14 is taken to be 200 meters, and the duration of the measurement is taken to be 20 seconds. Thus, the speed of imaging device 12 is 10 meters/sec. in this example.

Figure 3:
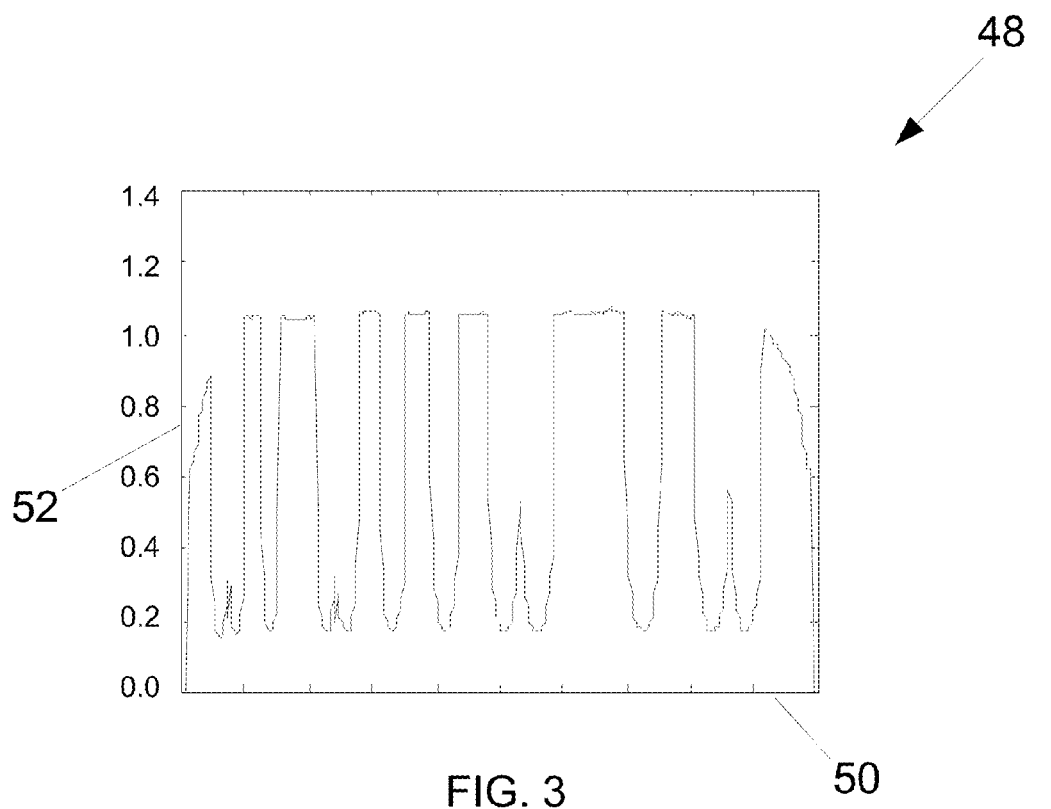
FIG. 3 illustrates a far-field response of a coded aperture to a single measured photon.
Figure 4:
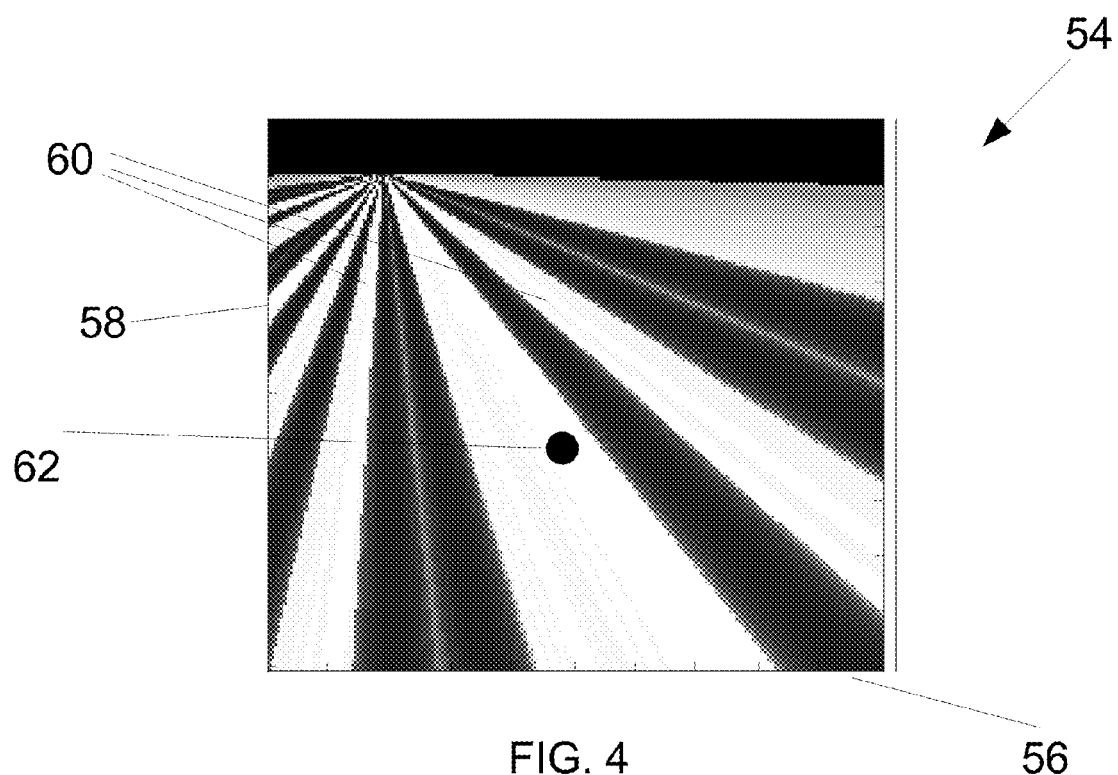
FIG. 4 illustrates a list-mode back-projection response using far-field data of FIG. 3.

As illustrated at step 32 of FIG. 2, back-projections of acquired far-field data may be reconstructed as a single-photon operation. This mode of operation, illustrated in FIGS. 3 and 4, is known as list mode and can be advantageous, for example, in low-count situations when one or more detectors has not counted a photon. An example of a single-photon response function is illustrated in FIG. 3, and its associated back-projection is illustrated in FIG. 4. As illustrated in FIG. 3, a far-field response 48 of a coded aperture to a single measured photon is the "shadow" of the mask 20 at each stimulated detector position as a function of azimuthal angle 50. This far-field response 48 represents the probability 52 of observing a photon at the detector element being described, given as a function of azimuthal angle 50. Because the elements of mask 20 do not block all high-energy photons, but allow some portion to pass through them, the response is not zero at any angle. One skilled in the art will recognize that this 1-D response function can be extended to a 2-D function when elevation angle is included. In such an application, the detector includes a 2-D array of elements configured to be stimulated from the gamma source 16 in one dimension as a function of azimuthal angle and in the second dimension as a function of elevation angle.

A back-projection 54 of the far-field response 48 of FIG. 3 is illustrated in FIG. 4 having x-coordinates 56 and y-coordinates 58. The 1-D far-field response 48 of FIG. 3 is a far-field image of the source distribution formed on the basis of the single photon observation. Back-projection 54 includes areas, illustrated in FIG. 4 as unshaded bands 60, that represent possible source locations of the single photon. For example, a location of the source from which the single photon originates may be at a source illustrated as an oversized point 62.

In order to back-project the 1-D response function into a plane, each pixel in the plane is associated with an azimuthal angle 50 from the detector location at the time of the observation. The value at each pixel is the value of the 1-D response function at that azimuthal angle 50. The result of this operation is depicted in FIG. 4, and represents the likelihood that the source is located at each position on the plane. As will be described, a plurality of back-projections 54 may be combined to form a near-field image of imaging device 12 of FIG. 1.

The list-mode back-projection approach illustrated in FIGS. 3 and 4 takes the response in range and angle for each detector in the pixelated detector array and back-projects the response into a space of the source or imaging device 12. This operation can be performed in count-by-count list mode, as illustrated, with the mobile platform 22 location at each detected count determining a virtual detector location for the single-count back-projection. In a pure list-mode back-projection, each single-count response is an angle-only function projected through space to form a spatial image of the angular response of the detector at that location.

However, in an alternate application, multiple consecutive counts can be aggregated to form a single spatial response function that can be back-projected as illustrated at step 34 of FIG. 2. This approach reduces computational burden by reducing the number of individual back-projection operations. The single-count responses are not angle-corrected during the aggregation operation, resulting in a longer baseline aperture for back-projection, and one that has a near-to-far field transition farther from the baseline location. This defines a trade-off between the length of baseline segment used in back-projection and the region of validity of the far-field results. Smaller segments may include more computations, but will result in valid back-projections at shorter ranges from the imaging platform.

Figure 5:
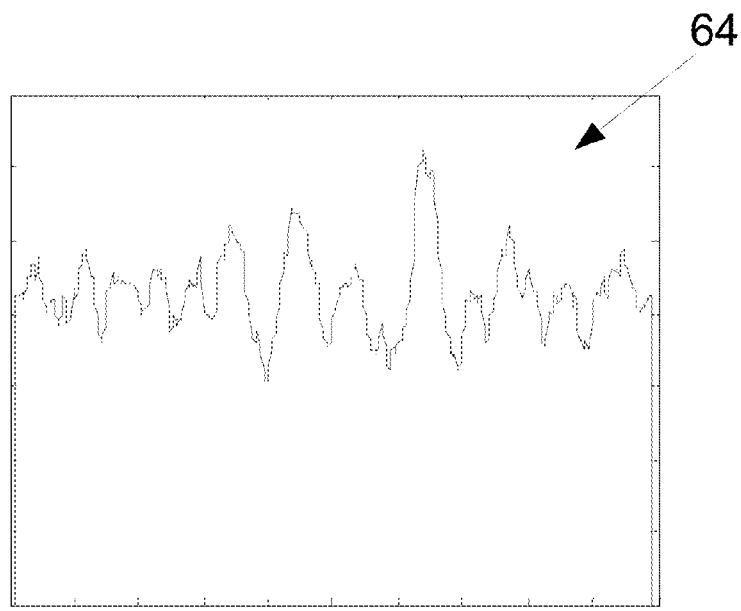
FIG. 5 illustrates an aggregated response function of a coded aperture.
Figure 6:
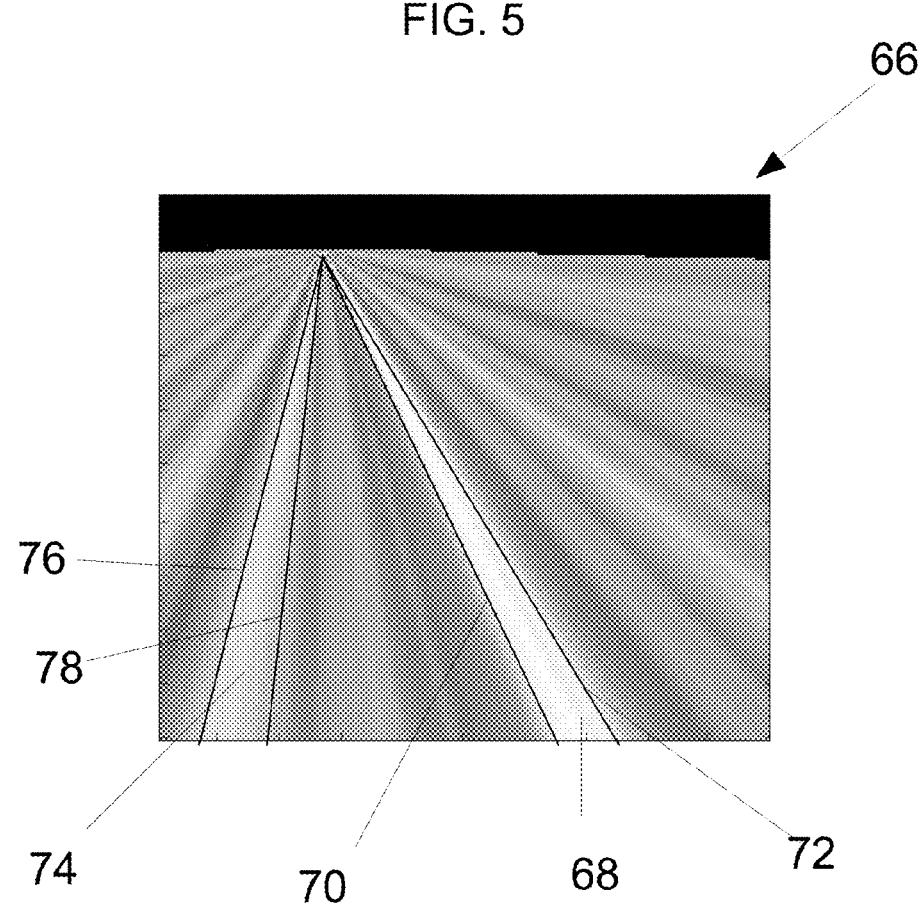
FIG. 6 illustrates an aggregated back-projection using far-field data of FIG. 5.

FIG. 5 illustrates an aggregated response function 64, and its associated back-projection 66 is illustrated in FIG. 6, according to an embodiment of the invention. This aggregated response function 64 is the sum of responses for a number of source photons and no background photons. As illustrated in FIG. 6, the source photons likely originate from a source on a beam 68 formed by the back-projection and falling between line 70 and line 72. However, note that other less-shaded regions, such as beam 74 falling between line 76 and line 78, are given significant likelihood of containing a source as well. This is because none of the individual responses provides very specific information about the actual location of the source. All of the responses include the correct direction, and it is the coincidence of responses that directs energy to the right location. Spatial localization of the source comes from the addition of many such images, each formed at a different position along the baseline.

The basic back-projection image formation for a planar (range & azimuth) imaging system using a 1-D detector array behind a 1-D array of absorbing elements can be summarized by writing the response function as r(θ,d), which represents the angular response of detector pixel "d" as a function of angle away from broadside. This same function also represents the normalized expected value of the "shadow" cast by a high intensity source at angle θ, as a function of detector pixel, "d." The list-mode back-projection, step 32 of FIG. 2, resulting from C measured counts can be expressed as a sum:

$$I(x, y) = \sum_{i=1}^{C} r\left(\arctan\left(\frac{x - x_i}{y - y_i}\right) - \theta_i, d_i\right); \quad \text{(Eqn. 1)}$$

where $(x_i, y_i)$ is the location of the imaging platform at the time of measurement of the $i^{th}$ count, $\theta_i$ is the angular orientation of the platform at that moment, and $d_i$ is the detector that recorded the $i^{th}$ count.

The back-projection image resulting from the aggregation operation, step 34 of FIG. 2, on the other hand, can be written as:

$$I_a(x, y) = \sum_{s=1}^{S} \sum_{i=1}^{C_s} r\left(\arctan\left(\frac{x - x_s}{y - y_s}\right) - \theta_s, d_i\right); \quad \text{(Eqn. 2)}$$

where S is the number of baseline segments defined for the aggregation scheme, $C_s$ is the number of counts in the segment "s," and $(x_s, y_s)$ is the nominal location of the segment, defined by:

$$x_s = \frac{x_{\sum_{n=1}^{s-1} C_n} + x_{\sum_{n=1}^{s} C_n}}{2} \text{ and } y_s = \frac{y_{\sum_{n=1}^{s-1} C_n} + y_{\sum_{n=1}^{s} C_n}}{2}; \quad \text{(Eqn. 3)}$$

where $\theta_s$ is the orientation angle of segment "s." In an alternate embodiment, if the segment is curved, a tangent to the curve can be used to define a straight segment, resulting in a piecewise linear path.

An image may be formed, as illustrated at step 36 of FIG. 2, by aggregated data using 4-meter sub-aperture or baseline segments, as an example. With a 4-meter sub-aperture, the list mode reconstruction (step 32 of FIG. 2) produces results similar to those of the aggregated baseline segment (step 34 of FIG. 2) approach. The image formed at step 36 may be contrast-enhanced by using a pointwise, non-linear transform applied to the amplitude. The unprocessed image is scaled by division by the number of measured photons so that its value at every point can be interpreted as being equal to that fraction of the total number of observations that back-project to that point. The processing includes scaling the linear image by its maximum value, which equals one in this illustration, raising the result to the fourth power, and dividing by the maximum value of the original image, so that the maximum of the final result is the same as that of the initial image. Thus, this is a monotonic transformation of amplitude values that preserves the numerical amplitude ordering of the pixels in the image.

The contrast enhancement makes the source more discernable to the eye of a human observer. However, from the point of view of thresholding and segmentation of the image, the images produced are considered equivalent because of their pixel amplitude ordering. In other words, the enhancement applied is "open-loop," in the sense that no image feedback is used to guide the image processing operation. As such, according to embodiments of the invention, illustrated at step 38 of FIG. 2, data-adaptive contrast enhancement algorithms that go under the name Expectation Maximization (EM) reconstruction may be employed to further enhance detectability of weak point sources observed in background radiation in a way that the simple pointwise amplitude transforms cannot.

An iterative reconstruction algorithm of Emission Tomography is the Shepp-Vardi algorithm, which may be referred to as an Expectation Maximization (EM) algorithm. The Shepp-Vardi approach is an iterative image processing algorithm for contrast enhancement that makes use of the special structure of images constructed as a sum of back-projection terms. The algorithm starts with a pre-existing version of the image and performs a multiplicative operation to enhance its contrast. The Shepp-Vardi algorithm's iteration can be written in simplified fashion as:

$$I_{new} = I_{old} \times \frac{1}{\alpha} \sum_{s=1}^{N} \frac{m(s)}{p(s)} \text{response}(s, \theta, r); \quad \text{(Eqn. 4)}$$

where the response is equivalent to the back-projected, multiple-photon far-field image formed for a particular sub-aperture as illustrated, for example, in FIG. 6. The value m(s) is a measurement associated with that response that is, in general, a number of counts. The response is the sum of multiple individual photon back-projections, and so the measurement can be taken to have a value of one count. From the point of view of the image reconstruction algorithm, this may be interpreted as a single photon measurement with a complicated measurement response function. The value α is an image representing the result of back-projection when m(s)=p(s) for all s, and point-by-point division by this term makes the correct reconstruction a fixed point of the iteration, since in that case the multiplication will be by an image composed of all ones.

The p(s) term makes it data-adaptive. It may be referred to as a "pseudo-measurement" and it is computed by projecting the current image onto the measurement response as though the current image were a source distribution:

$$p(s) = \iint_{field\ of\ view} I_{old}(\theta, r)\, d\theta dr; \quad \text{(Eqn. 5)}$$

This operation will actually be discrete, but is written as though it were a physical action over an actual source, as emulation of Eqn. 5 is the goal of the computation. If the current image exactly matches the real source distribution, then the scalar coefficients of the linear combination in Eqn. 4 are all unity and the image does not change. The data-adaptive coefficients in Eqn. 4 are based on an assumption that values that tend to emphasize responses that have not had a sufficiently great effect on the present image. In this way it attempts to explain all of the data in the reconstruction.

Thus, according to embodiments of the invention, the convergence rate may be increased, still referring to step 38 of FIG. 2, by a modification to the iteration to include ordered subsets of data, referred to as "ordered subsets expectation maximization," or OSEM. Thus, the image contrast is enhanced as shown in Eqn. 6:

$$I_{new} = I_{old} \times \prod_{s=1}^{S} \frac{1}{\alpha} \sum_{n \in \Omega(s)} \frac{m(n)}{p(n)} \text{response}(n, \theta, r); \quad \text{(Eqn. 6)}$$

where the iterated product is over a set of S distinct subsets of the responses, {Ω(s), for s=1, ..., S} In one embodiment, and referring back to FIG. 1, each subset is a group of unconnected sub-apertures 24 that spans the entire synthetic aperture of baseline 14 because such a set has essentially the same range resolution as the entire baseline. In an example, a set of fifty, 4-meter sub-apertures is divided into S=5 groups of 10 sub-apertures, where Ω(1)={1, 6, 11, 16, ..., 46}, ω(2)={2, 7, 12, 17, ..., 47}, and so on. The iterated product in Eqn. 6 is referred to as an iteration, and it uses all of the data once. The inner sum may be referred to as a sub-iteration, and it sums up the back-projection terms in a single subset, Ω(s).

And, although a set of fifty, 4-meter sub-apertures divided into S=5 groups of 10 sub-apertures is illustrated as an exemplary embodiment, it is understood that the scope of this invention includes any combination of groups and sub-apertures, as well as any sub-aperture size. Further, though the baseline is described as a 200 meter linear baseline, the baseline need be neither 200 meters nor linear.

When only one iteration is used, the number of summations of individual back-projection terms represented by Eqn. 6 is the same as that represented by the back-projection operation of Eqn. 2. In this sense, single-iteration OSEM can be seen as an alternative to back-projection, and such is illustrated at step 42 of FIG. 2.

Thus, there are different ways to apply the operations of EQNS. 4 and 6. One approach is to back-project using either list mode as illustrated at step 32 of FIG. 2, or to back-project in aggregated mode as in step 34 of FIG. 2. However, because a single iteration of the algorithm of Eqn. 6 is the functional equivalent of back-projection, the operation of Eqn. 6 may be seen as an alternative to back-projection rather than as post-processing. Note that a single iteration of EQN 4 with $\alpha=1$ and $I_{old}=1$ is simply back-projection, so that successive iterations are, in fact, post-processing. In either case, it is possible to use the first iteration of Eqn. 4 with higher iterations of Eqn. 6 to implement "OSEM post-processing."

A technical contribution for the disclosed method and apparatus is that provides for a computer implemented imaging system configured to detect a gamma ray point source and, more particularly, to reconstruct images for a synthetic aperture gamma ray imager.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. An imaging system, comprising:
a platform having mounted thereon a coded-aperture imaging device and positioned to receive radiation over a baseline; and
a computer configured to:
acquire a plurality of far-field datasets over the baseline, the plurality of far-field datasets comprising data received via the coded-aperture imaging device;
form a preliminary image based on the acquired plurality of far-field datasets; and
apply an expectation maximization (EM) algorithm to the preliminary image;
wherein the EM algorithm includes an ordered subset algorithm.

2. The imaging system of claim 1, wherein the computer is configured to form the preliminary image using a single iteration ordered subsets expectation maximization (OSEM) algorithm.

3. The imaging system of claim 1, wherein the computer, in being configured to apply the EM algorithm, is configured to apply the EM algorithm after formation of the preliminary image to enhance a contrast of the near-field image.

4. The imaging system of claim 1, wherein the computer is configured to back-project the acquired plurality of far-field datasets to form the preliminary image.

5. The imaging system of claim 4, wherein the computer, in being configured to back-project, is configured to back-project each far-field dataset in list mode as a single-photon operation.

6. The imaging system of claim 4, wherein the computer, in being configured to back-project, is configured to aggregate and back-project a subset of the plurality of far-field datasets as a single spatial response.

7. The imaging system of claim 1, wherein the plurality of far-field datasets are acquired with the platform positioned over N baseline segments along the baseline, wherein N is an integer $\geq 2$.

8. The imaging system of claim 1, wherein the received radiation is from a gamma source.

9. The imaging system of claim 1, further comprising a mobile vehicle having the computer and the platform mounted thereon.

10. The imaging system of claim 1, wherein the position sensitive radiation detector is an Anger camera.

11. The imaging system of claim 1, wherein the coded-aperture imaging device comprises:
a position-sensitive detector; and
a mask having a defined pattern of apertures therein such that each acquired far-field dataset is a shadow of the mask formed at positions on the detector.

12. The imaging system of claim 11, wherein the detector includes a two-dimensional array of elements configured to be stimulated in one dimension as a function of azimuthal angle and in a second dimension as a function of elevation angle.

13. A method of imaging comprising:
acquiring, via a position-sensitive detector, a plurality of far-field images, each far-field image comprising a measured distribution of photons on the position-sensitive detector acquired along an imaging baseline;
reconstructing a near-field image using the plurality of far-field images; and
enhancing contrast using at least one iteration of an expectation maximization (EM) reconstruction algorithm;
wherein the far-field images are ordered as subsets of data.

14. The method of imaging of claim 13, comprising reconstructing the near-field image using a single iteration ordered subsets expectation maximization (OSEM) algorithm.

15. The method of imaging of claim 13, comprising transporting the position-sensitive detector to a plurality of imaging locations over the imaging baseline; and
wherein the imaging baseline is defined by motion of a vehicle by which the position-sensitive detector is transported.

16. The method of imaging of claim 13, wherein acquiring the plurality of far-field images comprises acquiring the measured distribution of photons on the position-sensitive detector in both an azimuthal direction and an elevational direction.

17. The method of imaging of claim 13, comprising reconstructing the near-field image by back-projecting each far-field image in a list mode.

18. The method of imaging of claim 13, comprising reconstructing the near-field image by back-projecting each far-field image in an aggregated mode from multiple consecutive counts to form a single spatial response.

19. A computer readable storage medium having stored thereon a program, which, when executed by a processor, causes the processor to:

acquire a plurality of real-valued images of a radiation source from a coded-aperture imaging device over a synthetic aperture and located in a far-field of the radiation source;

reconstruct a near-field image of the source using the real-valued images; and enhance contrast of the reconstructed near-field image using an ordered subsets expectation maximization (OSEM) algorithm.

20. The computer readable storage medium of claim 19, wherein the program causes the processor to reconstruct the image in one of a single-photon operation and an aggregated operation.

21. The computer readable storage medium of claim 20, wherein, for C measured counts of a single-photon operation, the list-mode back-projection resulting therefrom is expressed as a sum:

$$I(x, y) = \sum_{i=1}^{C} r\left(\arctan\left(\frac{x - x_i}{y - y_i}\right) - \theta_i, d_i\right);$$

wherein:

$(x_i, y_i)$ is a location of the imaging device at the time of measurement of the $i^{th}$ count;

$\theta_i$ is the angular orientation of the platform at that moment; and $d_i$ is the detector that recorded the $i^{th}$ count.

22. The computer readable storage medium of claim 20, wherein, for an aggregated operation, the aggregated back-projection is expressed as a sum:

$$I_a(x, y) = \sum_{s=1}^{S} \sum_{i=1}^{C_s} r\left(\arctan\left(\frac{x - x_s}{y - y_s}\right) - \theta_s, d_i\right);$$

wherein

S is the number of baseline segments defined for the aggregation scheme;

$C_s$ is the number of counts in each segment s;

$(x_s, y_s)$ is the nominal location of the segment, defined by:

$$x_s = \frac{x_{\sum_{n=1}^{s-1} C_n} + x_{\sum_{n=1}^{s} C_n}}{2} \text{ and } y_s = \frac{y_{\sum_{n=1}^{s-1} C_n} + y_{\sum_{n=1}^{s} C_n}}{2};$$

and $\theta_s$ is the orientation angle of segment "s."

23. The computer readable storage medium of claim 19, wherein the synthetic aperture is defined by a plurality of positions from which the imaging device acquires the plurality of real-value images.

24. The computer readable storage medium of claim 19, wherein the program causes the processor to reconstruct the image using a single iteration OSEM algorithm.

* * * * *